United States Patent [19]
Day

[11] 3,786,859
[45] Jan. 22, 1974

[54] TEMPERATURE AND HUMIDITY CONTROL AND APPARATUS FOR RESIDENTIAL BUILDINGS

[76] Inventor: Wendell E. Day, Box 338, Sunbury, Ohio

[22] Filed: June 19, 1972

[21] Appl. No.: 263,779

[52] U.S. Cl. .................. 165/21, 165/27, 236/1 B
[51] Int. Cl. ............................................. F24f 3/14
[58] Field of Search ........ 165/21, 22, 26, 27; 62/90; 236/1 B

[56] References Cited
UNITED STATES PATENTS

| | | | |
|---|---|---|---|
| 2,544,544 | 3/1951 | Qualley et al. | 165/21 X |
| 3,352,352 | 11/1967 | Walters | 165/21 X |
| 3,714,980 | 2/1973 | Lancia et al. | 165/26 X |
| 3,694,925 | 10/1972 | Coyle et al. | 165/21 X |

*Primary Examiner*—Manuel A. Antonakas
*Attorney, Agent, or Firm*—Mahoney, Miller & Stebens

[57] ABSTRACT

Apparatus and electrical control circuit is provided for control of temperature and humidity in residential structures. Heating and cooling of residences utilizes separate units for heating and cooling that are independently operable although both units are incorporated in a common air circulation system. A change-over type control system is provided to permit essentially seasonal operation as to either heating or cooling. The apparatus and electrical control circuit provided includes a humidity sensor and auxiliary heating means selectively operable in cooperation with the cooling unit to effect dehumidification irrespective of cooling requirements but maintaining a relatively constant temperature while continuing dehumidification.

5 Claims, 2 Drawing Figures

TEMPERATURE AND HUMIDITY CONTROL AND APPARATUS FOR RESIDENTIAL BUILDINGS

BACKGROUND OF THE INVENTION

Heating and cooling systems of the forced-air type commonly installed in single-family residences usually include separate and independently controlled units for heating and cooling. A common air circulation system having a fan or blower is also provided for both heating and cooling and automatic temperature control is selected for operation of either as dictated by the prevailing seasonal temperature. Humidity control is not provided when operating in a cooling mode but is often provided in a heating mode by means of a humidifier that is operated concurrently with the heating unit in accordance with the control signal obtained from a humidity sensing device such as a humidistat. Concurrent operation of the humidifier and heating unit is desired for economical reasons in that the same air must be circulated for both and humidification is most effectively accomplished during such times as the circulating air is heated. During the normal heating season, the usually colder temperatures result in a substantially low humidity and there are only very infrequent occasions when the humidity increases to an undesirable level. Accordingly, it is not usually necessary to consider or provide for dehumidification during the noraml heating season and temperature is the controlling factor with respect to heating with a humidistat providing auxiliary concurrent control as to the humidifier.

During the normal cooling season, however, the air temperatures are usually in a range that permits the amount of moisture to increase to levels that are undesirable. Operation of the cooling unit will also be effective in reducing the humidity; however, a reduction in the humidity by this means alone may often be inadequate since the temperature may be within or controlled within the desired range with the humidity being at an undesirable, relatively high value. This is particularly noticeable during periods of weather having cool or moderate temperatures accompanied by substantial or frequent rains or periods of weather having higher temperatures and high humidity as often occurs during the spring and fall seasons. While the temperature may be at a sufficiently high level so as to be within a desired range without requiring heating, the cooling unit will most likely not be operating and this leaves the humidity at a level determined by environmental conditions. Such a situation is undesirable merely from the standpoint of comfort and is very undesirable for health reasons, as is well known to those having respiratory problems, as well as being detrimental to furniture and other apparatus.

BRIEF DESCRIPTION OF THE INVENTION

This invention is directed to apparatus and electrical control circuitry suitable for installation or incorporation in cooling systems for residential buildings to maintain and control the humidity in conjunction with the temperature. Cooling systems for this purpose are of relatively small capacity and a proportionally low cost is a material factor in determining the type of apparatus and control system that will be installed. A usual type of single-family residence installation utilizes a common air circulating system in which both a heating unit and a cooling unit are incorporated and includes an air circulating fan or blower. The control system and apparatus of this invention incorporates a secondary heating unit in the air circulating system in down-stream relationship to the evaporator of the cooling unit. The primary heating unit is located upstream from the evaporator with the circulating fan being upstream relative to the primary heating unit. The control system of this invention provides for automatic operation in either a heating or cooling mode that are alternatively selectable by either manual or automatic means and utilize the same air circulating fan. In the cooling mode, the control system incorporates a thermostat and a humidistat that function in cooperation with each other to maintain the temperature and the humidity at desired respective levels or within desired ranges. Operation in the cooling mode provides automatic control of the temperature within a desired range through utilization of the cooling unit alone under the control of the thermostat while dehumidification is effected through combined operation of the cooling unit and the secondary heating unit under the primary control of the humidistat. The control system provided by this invention produces dehumidification through continuing operation of the cooling unit to further remove moisture with the secondary heating unit being concurrently operated to return the temperature of the air subsequent to its dehumidification to within the desired range. Utilization of the humidistat in concurrent control of the cooling unit results in maintenance of the temperature within the desired range along with reduction in the humidity when the humidity is above the desired range.

These and other objects and advantages of this invention will be readily apparent from the following detailed description of an embodiment thereof and the accompanying drawings.

DETAILED DESCRIPTION OF AN EMBODIMENT OF THE INVENTION

Figure 1:
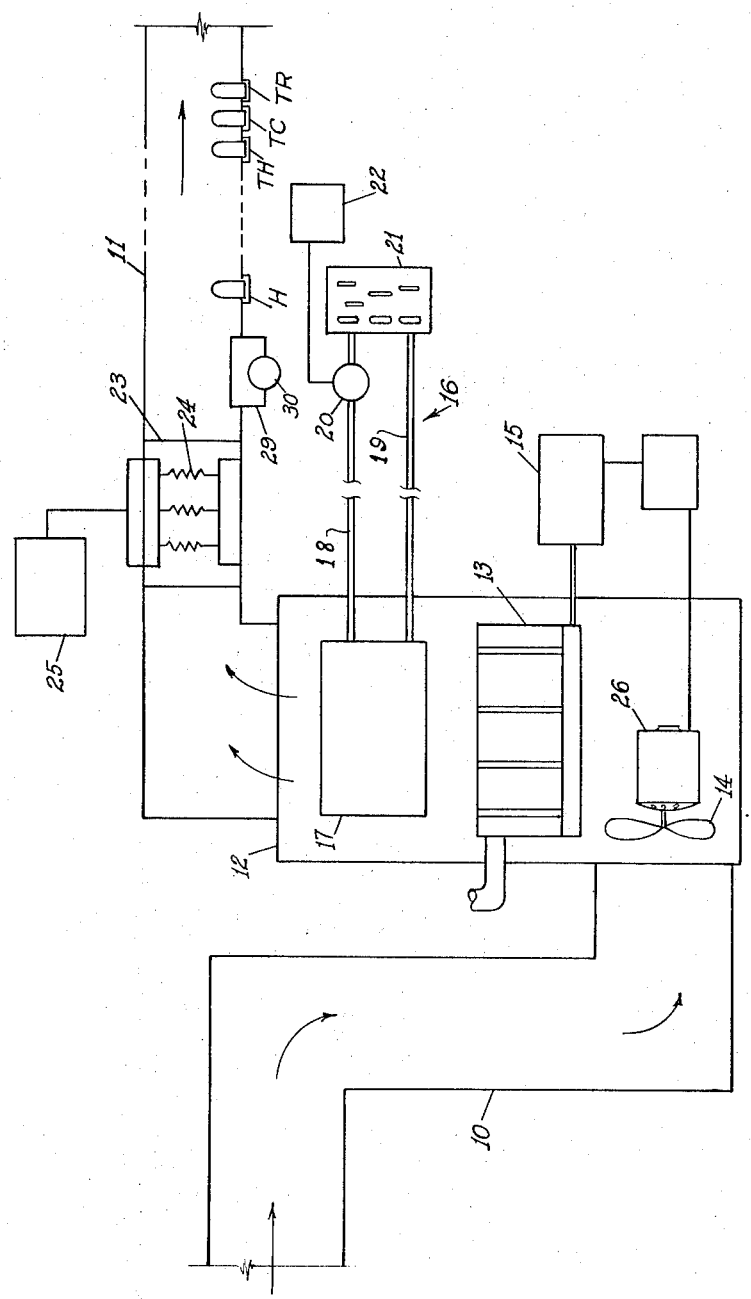
FIG. 1 is a diagramatic view of a heating and cooling apparatus embodying this invention.

FIG. 1 diagramatically illustrates the components of a heating and cooling system constructed in accordance with this invention for installation in a residential building. The air circulating system is represented by a short section of ducts or conduits 10 and 11 connecting a heating unit 12 with the living areas of a residence. The illustrated primary heating unit 12 may be of either the gas or oil-fired type or the electric type having an air heating chamber sized to enclose the heating element 13 and an air circulating fan or blower 14. Associated with the heating element 13 is a heat control 15 comprising an electric-solenoid operation fuel valve electrical contacter (not shown) controlling the supply of fuel or electrical energy to the heating element. This heat control 15 is of well known construction and operation and also controls the operation of the fan 14 during a heating mode in response to temperatures within the heating chamber.

A cooling unit 16 is also provided comprising an evaporator 17 mounted in the heating chamber fluid-coupled by piping 18 and 19 to a refrigerant compressor 20 and condensor 21 which are both relatively remotely located. The evaporator 17 is positioned downstream from the heating element 13 in accordance with customary installation practices. A compressor control 22 of a commercially available type is electrically connected with the compressor and includes a set of relay-operated contacts in the electrical energizing circuit for the compressor.

Mounted in the conduit 11 in downstream relationship to the evaporator 17 is a secondary heating unit 23, or reheat, which, in this illustrative embodiment, comprises electrical heating elements 24 that are controlled by a reheat control 25 including a set of relay-operated electrical contacts in association with necessary protective circuitry. Other types of heat sources may be utilized for this secondary heating unit as determined most advantageous for a specific installation.

Figure 2:
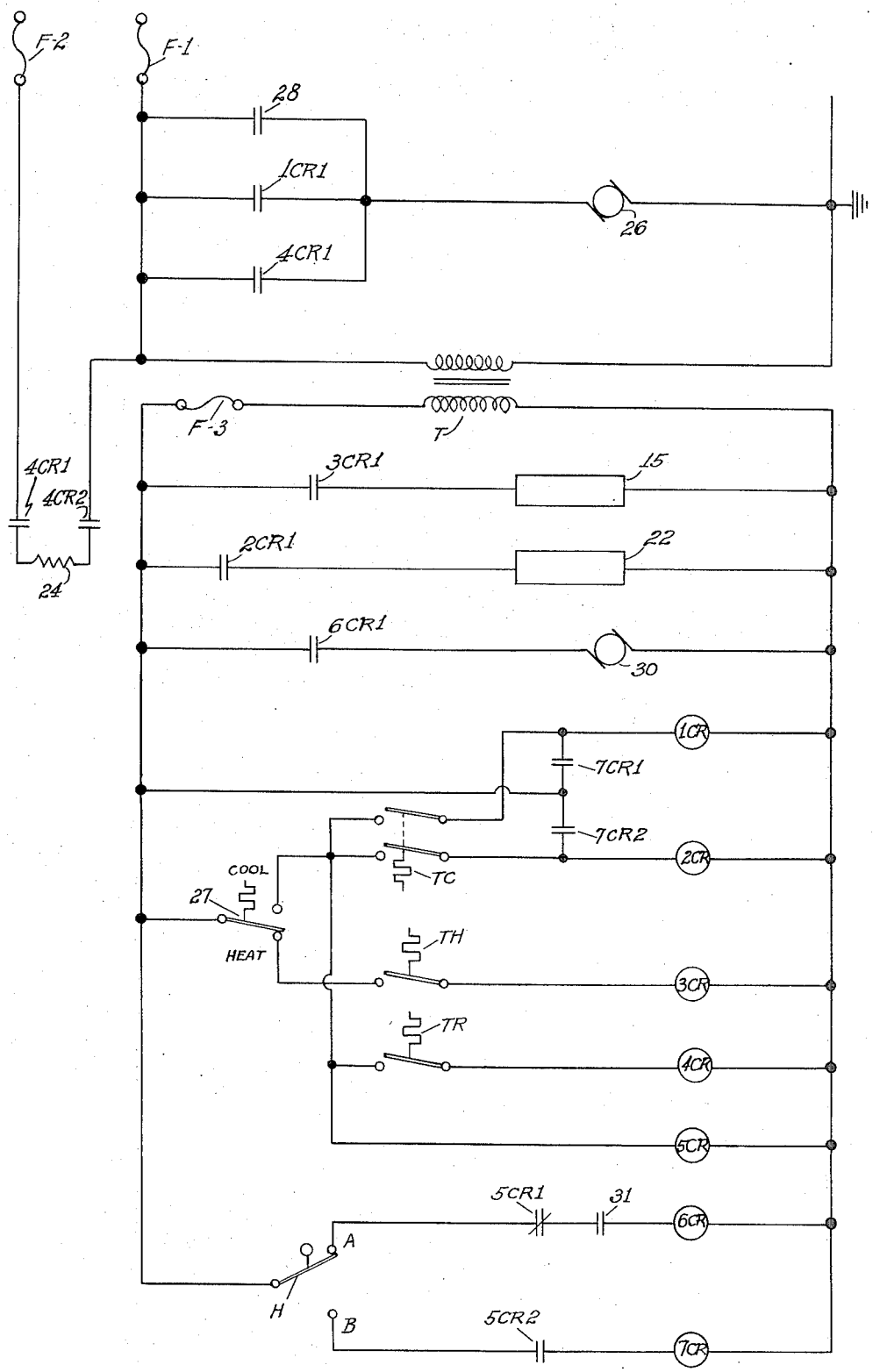
FIG. 2 is a schematic diagram of the electric control circuit for this apparatus.

Controlling operation of the several components of the apparatus is an electrical circuit schematically shown in FIG. 2. This circuit comprises a high voltage power section connectable to a suitable source of power through the fuses F1 and F2 for energization of an electric motor 26 mechanically coupled with and driving the fan 14 and for energization of the electrical heating elements 24. The several heating elements 24 are schematically shown as a single element in FIG. 2 but it will be understood that the number required in any particular installation will be dictated by the specific environmental circumstances. Also connected to this high voltage power section is a relatively low voltage control circuit which derives its power through a transformer T with the control circuit being protected by a fuse F3.

The control circuit includes two major sections that are effectively alternatively operable to place the apparatus either in a heating mode or cooling mode. This is automatically effected in the illustrated embodiment by a thermostatically operated changeover switch 27 which will be placed in either of two positions that are designated "heat" and "cool" in accordance with the outside air temperature setting of 50° F. has been found satisfactory for automatic changeover. When placed in the "heat" position, this switch 27 energizes a circuit connected with the heat control 15, symbolically shown as a relay coil 3CR, through a thermostatic switch TH which is usually physically located in the living area of the residence but is shown for illustrative purposes as being positioned in a dowstream portion of the conduit 11. Switch TH is of a type designed to close when the temperature decreases to a predetermined minimum level and opens when the temperature rises a few degrees above this level thereby operating to automatically maintain the temperature relatively constant within a range of a few degrees. A decrease in the temperature resulting in closing of switch TH energizes relay 3CR thus closing its contacts 3CR1 thus activating the heat control 15 and the heating element 13 is then operated to generate heat and raise the temperature of the air in the heating chamber. After the temperature in the heating chamber has increased to a predetermined value, a set of normally open switch contacts 28 actuated by an internal thermostatic device (not shown) of the heat control 15 are closed to complete an electrical circuit to the fan motor 26 which then drives the fan 14 and circulates the air through the ducts 10 and 11 and the heating unit 12 thereby increasing the temperature of the air in the living areas of the residence. When the temperature of air reaches the set upper limit, switch TH will open to deactivate the heat control 15 although the contacts 28 will remain closed until the temperature within the heating chamber has decreased for protection of the structural components. Automatic cyclic operation of this portion of the circuit will thus maintain the air temperature in the living areas relatively constant within the prescribed range. Although not shown in the drawings, it will be noted that the heat control 15 will necessarily include other electrical switches and apparatus as may be required by applicable safety, building or construction codes or regulations such as, for example, a high temperature switch to terminate heat generation in the event that the temperature within the heating chamber exceeds a maximum safe or allowable temperature while continuing fan operation for cooling.

It is also desirable to maintain the humidity at a desired level during heating operations and this requires addition of moisture to the air that is circulated through the system. It is only necessary to consider addition of moisture since the air during colder seasons require heating usually has a moisture content that is well below the desired humidity level. Accordingly, humidification equipment may advantageously be incorporated to add the necessary moisture. This equipment may include a humidifier 29 of any of the well known commercially available types which is usually positioned in association with the conduit 11 downstream from the secondary heating unit 23 and a humidistat H for automatic electrical control of the humidifier 29. As shown in FIG. 2, the humidistat H comprises a two position switch element which will remain in position A until the humidity rises above a desired minimum index. In position A, the humidistat H completes an electrical circuit through a relay 6CR for energization thereof and closing of a contact 6CR1 in the electrical circuit to the humidifier 29 represented in FIG. 2 as having an electric drive motor 30. Since the humidifier is not effective in the apparatus unless air is being circulated through the ducts 10 and 11, provision is made to prevent energization of the relay 6CR except when the heat control 15 is activated and the fan 14 is operating in the form of a second set of normally open switch contacts 31 connected in series with the relay 6CR. These contacts 31 will be closed when both the heat control 15 is activated to supply fuel to the heating element 13 and the fan motor 26 is energized.

Cooling is effected automatically by movement of the changeover switch 27 to the "cool" position in response to increase in the ambient outside air temperature to a point above its operating point which then connects into the circuit, those portions of the control circuit associated with the cooling unit 16 thus, circuits are energized to the relay coils 1CR, 2CR, 4CR and 5CR which perform the respective functions of controlling the fan 14, compressor control 22, reheat control 23 and assuring alternate operation of the humidistat H. A thermostatic switch TC having a pair of switch elements interposed in the parallel connected circuits for the fan relay 1CR and compressor relay 2CR and usually located in the living area of the residence, although shown for convenience of illustration in the downstream portion of the duct 11, is operable upon the temperature reaching a predetermined maximum value to close and energize the compressor relay and fan relay. Energization of these relays closes their respective normally open contacts 1CR1 and 2CR1 to energize the fan motor 26 driving the fan 14 to circulate air through the system and the compressor control 22 to operate the compressor 20 in circulating refrigerant through the evaporator 17 and condenser 21. When the air temperature has been reduced to a value a few degrees below that at which the thermostatic switch TC closes, this switch will open and deenergize the fan and compressor relays 1CR and 2CR thereby halting further cooling. Operation of the thermostatic switch TC in response to the air temperature results in automatic cyclic operation of the cooling unit 16 to maintain the air temperature within a prescribed range.

A normal cooling mode of operation as described in the preceeding paragraph does not consider the factor of humidity and is solely dependent on temperature. However, humidity does materially affect comfort, health and condition of furniture or other apparatus and the apparatus and control system of this invention also provides control of the humidity to a greater degree and particularly during such times as when the temperature is below that point where the cooling unit will be operated merely in response to temperature as sensed by the thermostat TC. Operation of the cooling unit will effect dehumidification through cooling of the air passing through the evaporator 17 but, in the usual prior art installation of a cooling unit having only temperature control, dehumidification by this means is often insufficient during operation of the cooling unit and is not existant at all other times.

In accordance with this invention dehumidification may also be effected at times when the temperature is below that at which the thermostatic switch TC closes through placement of control of the cooling unit under the humidistat H. As the humidity rises above a level determined as the maximum acceptable, the humidistat H will operate to place the switch element in position B and complete a circuit to a relay coil 7CR. At this time, relay coil 5CR is energized maintaining its normally closed contact 5CR1 open and its normally open contact 5CR2 closed. This assures that the humidifier 29 will not be operable and enable the dehumidification operation by permitting energization of relay 7CR at any time the humidistat H is in position B. Energization of relay 7CR causes its normally open contacts 7CR1 and 7CR2 to close completing a circuit to the fan and compressor relays 1CR and 2CR resulting in energization of these relays and operation of the fan 14 and cooling unit. This results in dehumidification with a consequent reduction in temperature and necessitates reheating of the air to prevent lowering of the temperature to an uncomfortable level. Reheat is effected by the secondary heating unit 23 and is controlled by a thermostatic switch TR connected in circuit with the reheat relay 4CR. As the temperature decreases to a point below a selected value, which value is a few degrees lower than that at which switch TC is set to open, switch TR closes energizing reheat relay 4CR to close its contacts 4CR1 and 4CR2 and to also close a contact 4CR3 connected in circuit with the fan motor 26. This results in energization of the electrical heating elements 24 and assures continued operation of the fan 14 in the event that relay 7CR should become deenergized as a consequence of the humidity decreasing to a value where the humidistat H returns to position A. Both thermostat TR and humidistat H will contine to cyclically operate to automatically maintain the humidity and temperatrue within the desired ranges.

The cooling and dehumidification functions have been described as separate operations but it will be apparent that these functions are concurrently controllable as determined by both the temperature and humidity. Where both humidity and temperature are above the desired respective ranges, the thermostatic switch TC and humidistat H will be operated to energize the fan and compressor relays 1CR and 2CR. If the humidity level is first satisfactorily reduced to a point below the upper level, then humidistat H returns to position A and the cooling unit 16 continues to operate solely under control of the thermostat TC. If the temperature is first reduced to within the desired range then thermostat TC opens but the cooling unit 16 continues to operate under control of the humidistat H to effect further dehumidification. Concurrently, if the temperature is further reduced, thermostat TR will also function to operate the secondary reheating unit 23 and maintain the temperature within the desired range.

The circuit and apparatus of this invention is also capable of maintaining the air temperature in the cooling mode of operation with the changeover switch 27 in the "cool" position when the temperature would otherwise be lower than the desired range as determined by the thermostatic switch TC. In this mode of operation, assuming that the humidity is also lower than the predetermined maximum, the thermostatic switch TR will cause its switch contacts to close thereby energizing the reheat relay 4CR to energize the fan motor 26 and the reheat control 25 thereby closing contacts 4CR1 and 4CR2 for the previously described reheat functions. The thermostatic switch TR is set to open at a temperature which is below the temperature at which the thermostatic switch TC closes to prevent subsequent operation of the cooling unit 16. It will be apparent that the heating requirements must not be of a large magnitude in this mode of operation due to the relatively limited heating capabilities of the secondary reheating unit.

It will be readily apparent that this invention provides a novel apparatus and control circuit for both temperature and humidity control of single family residential buildings. This apparatus utilizes the heating components and cooling components normally installed and provides dehumidification and control humidity control in a cooling mode of operation. Thus, both temperature and humidity control are accomplished by a novel control circuit in conjunction with a conventional cooling unit and the incorporation of a secondary reheating unit.

Having thus described this invention, what is claimed is:

1. A temperature and humidity control and apparatus for a circulating air system comprising
 a fan drivingly coupled with an electric motor and interposed in the air stream for inducing circulation of air,
 air cooling means having a heat exchanger positioned in the air system and an electrical control,
 air heating means positioned in the air system in downstream relationship to said cooling means heat exchanger and including an electrical control, and
 control means including first and second temperature sensing means and humidity sensing means disposed in responsive relationship to the air circulated in the air system, each said sensing means having respective electrical switch means actuated in response to the respective parameter sensed, and electrical circuit means interconnected with each said electrical switch means, with said fan motor, cooling means electrical control and heating means electrical control for controlling operation thereof to maintain the temperature and humidity of the circulating air within respective predetermined ranges, the electrical switch means of said first temperature sensing means operatively connected in circuit with the electrical control of said cooling means and said fan motor and the electrical switch means of said second temperature sensing means operatively connected in circuit with the electrical control of said heating means, said first temperature sensing means operative to open its respective electrical switch means a first predetermined temperature and to close its respective switch means at a relatively higher temperature thereby defining a first predetermined temperature range, said second temperature sensing means operative to close its respective electrical switch means at a second predetermined temperature and to open its respective switch means at a relatively higher temperature thereby defining a second predetermined temperature range having the highest temperature thereof lower than the highest temperature of said first temperature range and the lowest temperature thereof lower than the lowest temperature of said first temperature range, and the electrical switch means of said humidity sensing means operatively connected in circuit with the electrical control of said cooling means and said fan motor, said humidity sensing means operative to energize the electrical control of said cooling means and said fan motor for operation thereof when the humidity is at or above a predetermined level.

2. A temperature and humidity control and apparatus according to claim 1 including second air heating means positioned in the air system in upstream relationship to said cooling means heat exchanger and including an electrical control, said control means including third temperature sensing means disposed in responsive relationship to the air circulated in the air system and which sensing means includes electrical switch means actuated in response to the temperature sensed, said last mentioned switch means interconnected by said electrical circuit means with the electrical control of said second heating means for controlling operation thereof.

3. A temperature and humidity control and apparatus according to claim 2 including fourth temperature sensing means having electrical switch means interconnected by said electrical circuit means to alternatively connect either the switch means of said third temperature sensing means or the switch means of said first and second temperature sensing means to a source of electrical power, said fourth temperature sensing means disposed in responsive relationship to ambient air.

4. A temperature and humidity control and apparatus according to claim 3 including humidification means positioned in the air system in downstream relationship to said second air heating means and having electrically energizable operating means, said operating means interconnected with the switch means of said humidity sensing means for energization thereof when the humidity is at or below a predetermined level.

5. A temperature and humidity control and apparatus according to claim 4 wherein said electrical circuit means includes an electrical interlock connected in circuit with the switch means of said humidity sensing means to prevent operation of said humidification means when said cooling means is operating.

* * * * *